US006627085B2

(12) United States Patent
Burrows et al.

(10) Patent No.: US 6,627,085 B2
(45) Date of Patent: Sep. 30, 2003

(54) TREATMENT OF BRINE TO REMOVE METALS AND SILICON THEREFROM

(75) Inventors: Derrek R. Burrows, Witchita, KS (US); Brian W. Johnson, Prairieville, LA (US)

(73) Assignee: Vulcan Chemicals, Birmingham, AL (US)

(*) Notice: Subject to any disclaimer, the term of this patent is extended or adjusted under 35 U.S.C. 154(b) by 108 days.

(21) Appl. No.: 09/891,015

(22) Filed: Jun. 25, 2001

(65) Prior Publication Data
US 2003/0026749 A1 Feb. 6, 2003

(51) Int. Cl.[7] .................................................. C02F 1/60
(52) U.S. Cl. ....................... 210/705; 210/713; 210/715; 210/723; 423/158
(58) Field of Search ................................ 423/158, 165, 423/184; 210/702, 705, 710, 712, 713, 715, 723, 724, 737, 739

(56) References Cited

U.S. PATENT DOCUMENTS

| | | | |
|---|---|---|---|
| 2,307,466 A | 1/1943 | Noll et al. ..................... 210/23 |
| 2,401,924 A | 6/1946 | Goetz .......................... 210/16 |
| 2,963,355 A | 12/1960 | Dille et al. .................... 48/206 |
| 3,363,975 A | 1/1968 | Dunseth et al. ................ 23/107 |
| 4,038,365 A | 7/1977 | Patil et al. .................... 423/161 |
| 4,274,929 A | 6/1981 | Novak .......................... 704/98 |
| 4,515,665 A | * 5/1985 | Fair et al. ..................... 205/536 |
| 4,755,303 A | 7/1988 | Sweat .......................... 210/722 |
| 4,765,913 A | 8/1988 | Featherstone ............... 210/714 |
| 5,672,280 A | 9/1997 | Demópoulos et al. ...... 210/709 |
| 5,683,587 A | * 11/1997 | Ferrara et al. .............. 210/696 |
| 5,961,837 A | * 10/1999 | Ferrara et al. .............. 210/696 |
| 6,139,753 A | 10/2000 | Taylor ........................ 210/717 |

OTHER PUBLICATIONS

Nordell, Eskel, "Water Treatment for Industrial and Other Uses"; Reinhold Publishing Corporation, New York, 1961, Second Edition, pp. 528, 529 and 544–547.

* cited by examiner

*Primary Examiner*—Steven Bos
*Assistant Examiner*—Anthony Kuhar
(74) *Attorney, Agent, or Firm*—Armstrong, Westerman & Hattori, LLP

(57) ABSTRACT

Disclosed is a process for reducing the amount of silicon in brine. More specifically the silicon content of the brine is reduced to 1 ppm or less by using low caustic excess. The disclosed process can also be characterized as lowering sodium hydroxide excess (caustic excess) while maintaining the sodium carbonate level thereby obtaining a brine with a low level of silicon. A further purification step employs a sludge blanket.

12 Claims, 2 Drawing Sheets

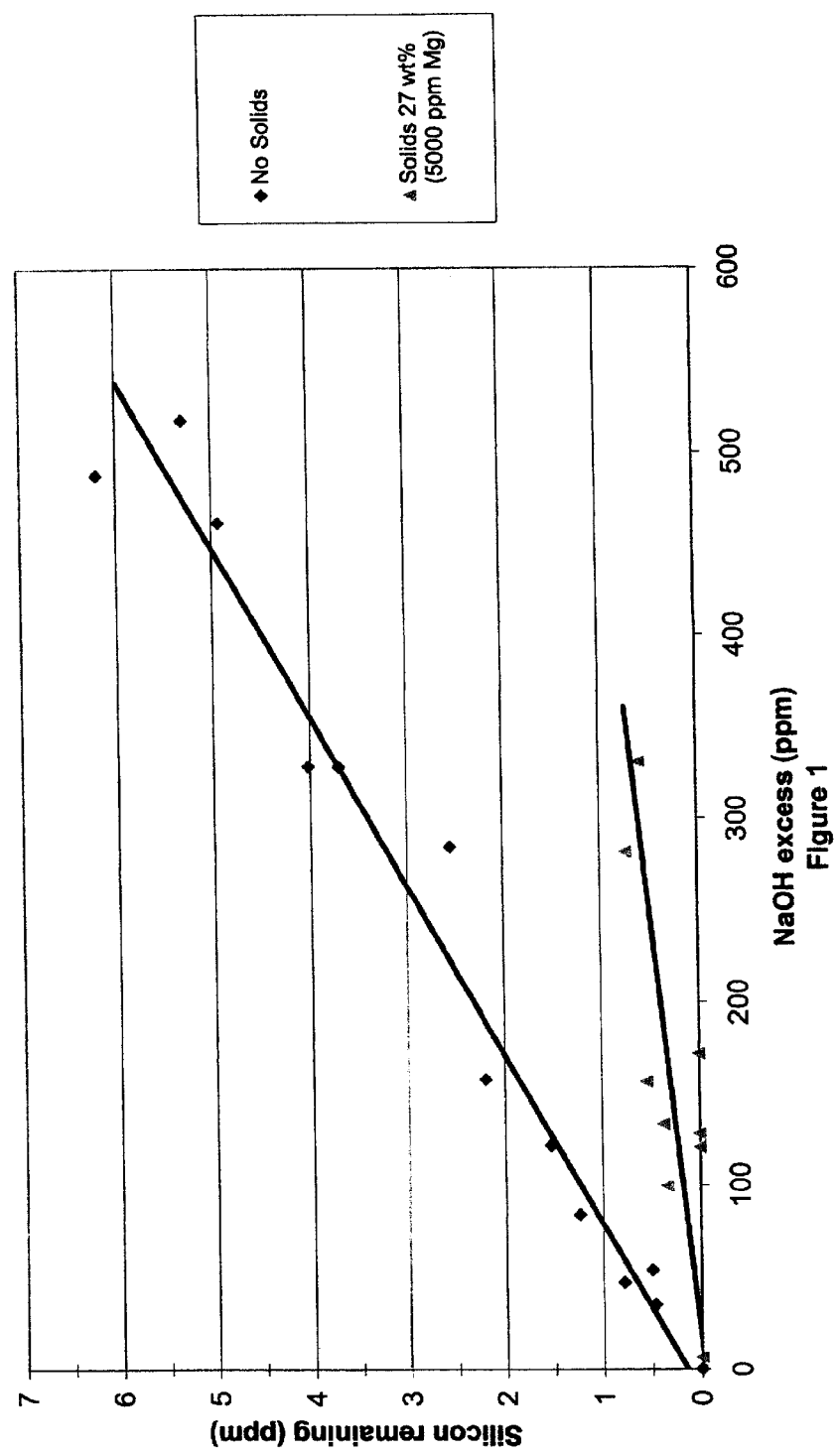

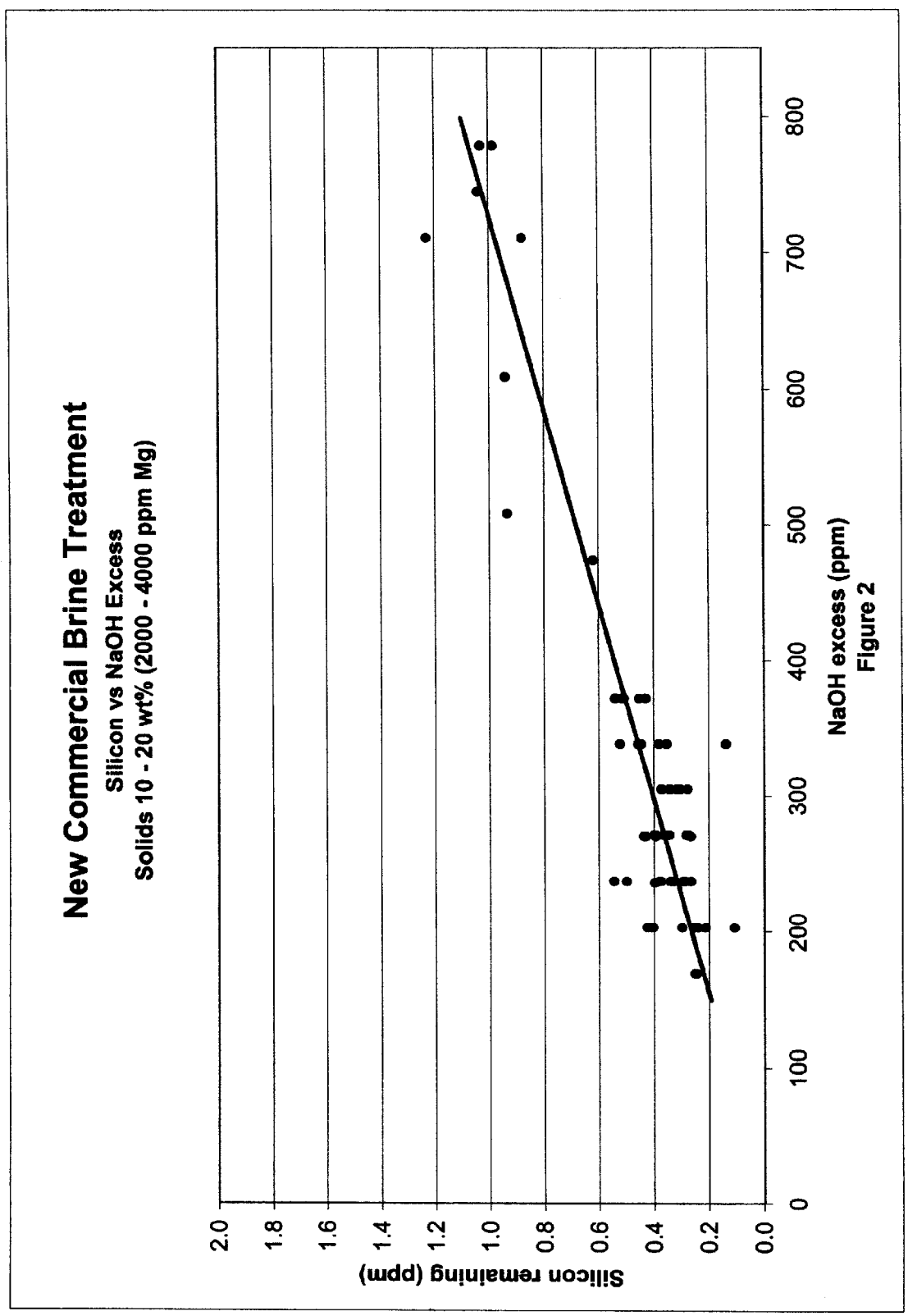

TREATMENT OF BRINE TO REMOVE METALS AND SILICON THEREFROM

FIELD OF THE INVENTION

The herein disclosed invention finds applicability in the field of brine purification processes.

BACKGROUND OF THE INVENTION

In traditional brine treatment methods, heated brine is mixed with sufficient soda ash and cell liquor to yield 500–700 ppm excesses of both NaOH and $Na_2CO_3$. Magnesium and calcium precipitate out as $Mg(OH)_2$ and $CaCO_3$, which are then settled out in a clarifier. The clarified brine is filtered and neutralized with HCl for use in electrolytic cells. The treated brine is optimized for magnesium and calcium; and to contain less than 6 ppm silicon. New technologies, however, require brine containing 1 ppm or less of silicon. The herein disclosed invention is designed to produce a brine with 1 ppm or less of silicon.

Prior Art Patents

Noll et al (U.S. Pat. No. 2,307,466) teaches a method designed to lower silica to acceptable levels in water. The process uses magnesium oxide alone or in combination with sodium hydroxide to rid the water of silica. The method taught by Noll et al is distinct from that of the instant invention in that silica is reduced in water and not in brine. Further, the process of Noll et al employs magnesium oxide, while the process of the herein disclosed invention employs sodium hydroxide and sodium carbonate to form a precipitate of magnesium hydroxide and magnesium carbonate.

Goetz (U.S. Pat. No. 2,401,924) teaches a method of removing silica from water using insoluble magnesium compounds. There is no teaching by Goetz to remove silica from brine employing the method of the herein disclosed invention.

Dille et al (U.S. Pat. No. 2,963,355) teaches the removal of silica from the fluid in the interior of a heating tube. There is no disclosure in this patent of a brine treating process.

Patil et al (U.S. Pat. No. 4,038,365) teaches a process for purifying brine comprising adding to said brine sodium carbonate and sodium hydroxide to cause the precipitation of calcium carbonate. There is no recognition in this patent of the need to remove silica to a low level, thereby allowing efficient industrial use.

Featherstone (U.S. Pat. No. 4,765,913) teaches the method of reducing silica in geothermal brine by pH adjustment by the addition of bases which react with heavy metals in the brine to form finely divided insoluble compounds which function as seed crystals to cause supersaturated amounts of silica to be precipitated from the brine.

None of the prior art patents cited show the inventive method of treating brine to reduce silicon content to acceptably low levels.

Definitions as Used in This Invention

The term caustic refers to sodium hydroxide.

The term brine refers to a salt solution at least containing silicon, magnesium and calcium.

The term ppm refers to parts per million.

A typical pretreated brine of this invention contains 8–12 ppm Si; 600–900 ppm Ca; and 50–70 ppm Mg.

While the herein disclosed invention has been characterized as using sodium hydroxide and sodium carbonate. It is readily apparent that a metal cation such as potassium or like metal ions could substitute for sodium.

OBJECTS OF THIS INVENTION

A main object of this invention is to produce a brine of low silicon content.

A further object of this invention is to produce a low silicon brine useful in modem technology, such as electrolytic cells.

A significant object of this invention is to produce a process for efficiently removing silicon from brine.

An additional object of this invention is to provide an improved continuous process for the removal of metals and silicon from a brine stream.

These and other objects of the present invention will become apparent from a reading of the following specification taken in conjunction with the enclosed drawings.

SUMMARY OF THE INVENTION

The traditional prior art treatment of brine uses caustic and carbonate addition to precipitate most of the metals, mainly magnesium and calcium. Silicon co-precipitates with the other salts, and after settling in a clarifier, the precipitate is removed as sludge. Using high caustic and carbonate excesses, this treatment effectively removes metals, and the silicon is reduced from 12 ppm to 5 ppm in the treated brine stream. New technology requires brine that contains 1 ppm silicon or less.

The inventors have discovered a novel treatment process that uses low caustic excess to both remove the metal contaminants, and reduce silicon concentration to 1 ppm or less. A further improvement is achieved by combining brine sludge recycle to remove metals and silicon at an increased range of caustic excesses. The invention can employ a continuous or batch process with the following features.

a. A means of feeding caustic and carbonate to a reaction tank which contains raw brine and is equipped with a mixer or some means of agitation.

b. A feedback control mechanism to maintain consistent 50–100 ppm caustic excess in the reactor.

c. Feeding the material from the reaction tank to a clarifier tank in which the solids are settled and removed as sludge.

d. Alternately, the sludge is recycled from the clarifier to the reaction tank. In this case, the caustic excess may be higher.

e. Treated brine is fed from the clarifier through a filter.

The invention involves a process for the removal of metal and silicon contaminants from a brine stream. Previous processes efficiently removed metals, but not silicon. The process of this invention removes silicon to much lower levels than previous processes. Metals such as magnesium and calcium are also removed. The process takes advantage of the discovery that silicon is best removed at low caustic excesses. The invention thus uses less caustic than previous methods. Previous methods relied upon high caustic and carbonate excesses, which then required substantial neutralization with HCl after treatment. With lower caustic excess, less HCl is needed for neutralization. The herein disclosed process may be combined with magnesium-laden sludge recycle to allow a greater effective range of caustic excesses. A greater range is useful if caustic excess control is difficult.

Conventional Brine Treatment Process

Raw sodium chloride brine intended for chloralkali electrolytic cells is solution mined from underground salt deposits, and contains high levels of hardness. A typical treatment method involves dosing the brine with enough sodium hydroxide (NaOH) and sodium carbonate (Na CO$_3$) to produce high excesses (200–500 ppm) of both chemicals. This treatment causes the calcium and magnesium to precipitate as calcium carbonate and magnesium hydroxide, which are both mostly insoluble in water as well as salt water. Silicon adsorbs to the precipitates, primarily to the magnesium hydroxide, and is removed with other precipitates in a clarifier. The clarified and filtered brine is at a pH of about 11–12, which is neutralized as required with hydrochloric acid before entering the chloralkali cells. New chloralkali membrane technology is required by industrial specifications to employ brine with lower silicon than the previous typical brine treatment method. Thus, there is a great benefit to be derived from the silicon removal process of this invention.

Brine Treatment of This Invention

A novel modification of the standard treatment method has been developed to reduce silicon to the desired specification of 1 ppm or less. It has been found that if NaOH addition was reduced to maintain an excess level of 0–70 ppm, the silicon could be reduced to less than 1 ppm. The actual amount of NaOH added and resulting pH varied somewhat based on Na$_2$ CO$_3$ levels, however, in the presence of 400 ppm Na$_2$ CO$_3$ excess, 0–70 ppm NaOH excess corresponded to a pH range of 9.0–9.9. If NaOH excesses were kept to 0–50 ppm (pH 9.0–9.8), then silicon was reduced to less than 0.5 ppm. Unfortunately, it was found that magnesium precipitation suffered when NaOH excesses were less than 30 ppm. Thus, a relatively narrow operative range was discovered for treating raw brine.

Example of Brine Treatment Method

Sufficient NaOH and Na$_2$ CO$_3$ are mixed into the brine to maintain a Na$_2$ CO$_3$ excess of 200–600 ppm, and NaOH excess of 30–70 ppm (pH 9.5–9.9). The reaction is performed at 140 degrees F., with two hours residence time. Calcium, magnesium, and silicon are all reduced to the levels shown in the table below as "New Treatment."

| Raw Brine: | Traditional Treated Brine: | New Treatment |
|---|---|---|
| pH: 6–7 | 11–12 | 9–10 |
| Si: 8–12 ppm | 5–6 ppm | <1 ppm |
| Ca: 600–900 ppm | <2 ppm | <2 ppm |
| Mg: 50–70 ppm | <0.1 ppm | <0.1 ppm |
| NaCl: 300 gpl (25 wt %) | 300 gpl (25 wt %) | 300 gpl (25 wt %) |

Method for Determination of Excess Sodium Hydroxide and Excess Sodium Carbonate in Brine Sample 1. Weigh a sample (e.g., 10 grams) of brine which has had a measured amount of sodium hydroxide and sodium carbonate added thereto into a glass breaker.

2. Add 10 ml of 100 grams per liter of barium chloride to the beaker to tie up sodium carbonate.

3. Turn on magnetic stirrer and add phenolphthaleim indicator.

4. Titrate to phenolphthalein end point (clear) with 0.01 normal HCl (end point is pH 8.3).

5. Record HCl volume as volume "P" in ml.

6. Add methyl orange/xylene cyanol (MOXC) indicator.

7. Titrate with 0.01 normal HCl to stable MOXC end point (slate grey to faint purple). The end point should be stable for one minute without fading back to green (end point is pH 3.8).

8. Record HCl volume as volume "M".

$$\text{NaOH excess ppm or micrograms/gram} = \frac{\text{"}P\text{"} \times 0.01 \times 40{,}000}{\text{weight of sample (10 gm)}}$$

P=volume of HCl in ml. (Step 5)
0.01=normality of HCl
40,000=M.W. of Na OH×1,000

$$\text{Na}_2\text{CO}_3 \text{ excess ppm or micrograms/gram} = \frac{\text{"}M\text{"} \times 0.01 \times 53{,}000}{\text{Weight of sample (10 gm)}}$$

M—volume of HCl in ml (step 8)
0.01=normality of HCl
53,000=½ M.W. of Na$_2$CO$_3$×1,000

The brine used in this invention can be mined from brine wells over a salt dome in Napoleonville, La. The Texas Brine Corporation actually mines the brine used in this invention. The brine contains therein as important components approximately 8–12 ppm silicon, 600–900 ppm calcium and 50–70 ppm magnesium. Brines from other sources having a like composition could be employed in this invention.

BRIEF DESCRIPTION OF THE DRAWINGS

FIG. 1 is a graph showing laboratory brine treatment with NaOH excess. The graph shows the relationship of silicon in ppm relative to NaOH excess with and without recycled solids.

FIG. 2 is a graph showing silica versus NaOH excess for commercial operation utilizing a sludge blanket and 14–24 hours residence time.

DESCRIPTION

For silicon removal, water treatment, the literature recommends high magnesium, alumina, or iron salt levels and pH of 10–12, usually in the form of a sludge blanket.

[1]Nordell, Eskel, "Water Treatment for Industrial and Other Uses," Reinhold Publishing Corp., New York, 1961.

The herein disclosed invention is based on the discovery that silicon can be reduced to 1.0 ppm or less in the pH range of about 8.0–9.9, which includes NaOH excesses from less than zero to no more than 70 ppm. It requires no sludge blanket, but is enhanced by the presence of recycled, magnesium-containing sludge.

Experiments were performed to determine if the current brine treatment, which uses carbonate and caustic addition to precipitate calcium and magnesium, could also remove silicon. Reaction time and amount of caustic excess were varied in batch experiments. Results indicated that silicon removal was inversely proportional to caustic excess. At 50 ppm or less caustic excesses, silicon was removed to under 0.5 ppm. However, at 30 ppm or less excesses, magnesium was not removed sufficiently. Calcium was precipitated by carbonate addition and was not affected by the other reaction variables. Longer reaction times appeared to remove slightly more silicon than shorter times. Thus, there was a narrow range of 30 to 50 ppm caustic excesses at which silicon and magnesium were removed to less than 0.5 ppm.

A series of experiments were performed with partial caustic and carbonate addition, resulting in no excess caustic or carbonate. The range of deficient reagent additions was 50%, 75%, and 90% of the experimentally determined amount necessary to neutralize the brine. Calcium and magnesium were not completely precipitated, but results indicated that silicon was removed to under 0.5 ppm when caustic was as low as 75% of the amount necessary for neutralization. However, a second stage with normal caustic and carbonate excesses is necessary to completely remove the remaining calcium and magnesium hardness.

Experiments were performed to determine if the low caustic excess method could be used in a continuous treatment system. Using a two-liter laboratory continuous brine treater, it was found that caustic excesses of 50 ppm removed silicon to under 0.5 ppm silicon. Using a pilot scale process of several 55-gallon reactor vessels connected in series, it was shown that silicon was reduced to around 0.5 ppm when caustic excesses were about 50 ppm. Sludge recycle was also tested in the pilot reactors, with results similar to the lab sludge recycle experiments. The method has been tested on a commercial scale, using a combination of caustic excess control and sludge recycle. It has been found that caustic excesses of 0 to 600 ppm NaOH removed silicon to under 1.0 ppm, as long as sludge was recycled to maintain 1000–5000 ppm magnesium.

The caustic excess range to remove silicon to under 1.0 ppm is 30 to 70 ppm NaOH.

The preferred excess range is 30 to 50 ppm NaOH to remove silicon to under 0.5 ppm.

The reaction time for this method is approximately one to four hours and the preferred reaction time is approximately two hours.

The preferred temperature for this method is 140° F.

Additionally, sludge recycle is useful to expand the above caustic excess ranges.

With sludge in the 1000–5000 ppm magnesium range, the caustic excess range for removing silicon to 1.0 ppm is 100 to 600 ppm NaOH.

With sludge in the 1000–5000 ppm magnesium range, the preferred caustic excess range is 30 ppm to 250 ppm, to achieve less than 0.5 ppm silicon.

A sludge addition modification has been found to help reduce silicon. It has been known for over half a century that contacting hard water or brine with high levels of magnesium hydroxide or oxide solids reduces silicon. A book with good examples and many references is Eskel Nordell's *Water Treatment for Industrial and Other Uses*, above cited. Laboratory tests showed that with a 5% magnesium hydroxide addition, silicon was reduced to less that 0.3 ppm, even at NaOH excesses over 300 ppm. A relevant patent, U.S. Pat. No. 4,274,929 to Novak, teaches that sludge left over from brine treatment, because of its magnesium content, was an economical alternative to adding pure magnesium hydroxide. Typical brine sludge, when vacuum filtered to a clay-like consistency was found to contain 1.75% magnesium (4.2% as Mg(OH)2) and 24% calcium (59.9% as $CaCO_3$). This solid material was added at several levels during treatment, as well as several levels of NaOH excess. The results showed that there was a relatively narrow operative range of NaOH excess at which silicon was reduced to under 1 ppm. This range was extended by sludge addition, just as it had been by the addition of pure magnesium hydroxide. (See FIG. 1.)

The inventors have used the low excess process, combined with sludge recycle in a new commercial sized treater. By maintaining the sludge recycle between 1000 and 5000 ppm as magnesium, the range of NaOH excesses at which silicon has been reduced to <1 ppm is 30–600 ppm (pH 9.5–11.0). The range of excesses at which silicon has been reduced to <0.5 ppm is 30–200 ppm (pH 9.5–10.5). These results are better than the lab and pilot treater results. These results are probably due to the residence time in the clarifier of 14–24 hours. Thus, the brine has much more contact time with sludge solids than the lab and pilot treaters. As was discovered in the laboratory, the commercial results show that silicon reduction is better at low NaOH excesses and worse at high excesses. (See FIG. 2.)

The new commercial treater is a sludge blanket treater. Water and treatment chemicals (NaOH and $Na_2CO_3$) are added and mixed in a well located in the center of the clarifier tank. The mixture is forced out the bottom of the well, into the bottom of the clarifier tank. Treated material is then taken off the top of the clarifier tank, having traveled up through the slowly stirred blanket of precipitated sludge covering the bottom of the clarifier tank. The treated overflow is filtered to remove solids. The treated and filtered brine is then neutralized as required with HCl before entering the chloralkali cells.

EXAMPLES

Brine feed for all of the experiments was either pipeline or pond brine from Geismar. The pH was typically 7.0 to 7.2. Metals analysis by I.C.P. typically ran as follows:

| | |
|---|---|
| Si | 8–12 ppm |
| Ca | 600–900 ppm |
| Mg | 50–60 ppm |

Example 1

For both experiments, the water bath was preheated to 140° F. Approximately 365 g samples of brine were weighted into four identical plastic reaction vessels, which were then placed into the water bath to warm for at least thirty minutes. Carbonate and caustic were then added to the brine, and the four-paddle chain mixer was started at about 45 rpm. After two hours reaction time, samples were poured into small plastic cups and allowed to settle for a least thirty minutes. Then a 30 cc liquid sample was drawn out with a disposable plastic syringe and filtered using 0.5 micron Teflon syringe filters. Results indicated that silicon removal was inversely proportional to caustic excess. Specifically, at 50 ppm or less caustic excesses, silicon was removed to 0.5 ppm or less. However, at 30 ppm or less excesses, magnesium was not removed sufficiently. Calcium was precipitated by carbonate addition and was not affected by the other reaction variables. Thus, there was a narrow range of 30 to 50 ppm caustic excesses at which silicon, calcium, and magnesium were all removed to less than 0.5 ppm. (See FIG. 1.) This range corresponded to approximately pH 9.5 to 9.8.

Example II

Experiments were performed at the same two hours reaction time and 140° F. temperature as Example I. The caustic and carbonate additions were reduced, resulting in no excess caustic or carbonate. The range of deficient reagent additions was 50%, 75% and 90% of the experimentally determined amount necessary to neutralize the brine. For this example, the caustic additions were 0.20. 0.30 and 0.36 grams caustic per kilogram of brine, which corresponded to a pH range of 7.8 to 9.0. The carbonate additions were 1.05, 1.58 and 1.89 grams carbonate per kilogram of brine. Magnesium and calcium were not completely precipitated in this range, but silicon was removed to under 0.5 ppm when caustic was from 50% to 90% of the amount necessary for brine neutralization.

Example III

Experiments were performed at the same two hours reaction time and 140° F. temperature. Brine sludge filtered from previous experiments was added at different levels, measured by magnesium content to be 500, 1,500 and 5,000 ppm magnesium. The caustic excess was varied at each sludge level. It was discovered that silicon could be removed to under 0.5 ppm at wider ranges of caustic excess when sludge was recycled. The maximum caustic excess to give less than 0.5 ppm silicon, at different sludge levels (expressed as magnesium content) was as follows:

| Sludge as magnesium (ppm) | None | 500 | 1,500 | 5,000 |
|---|---|---|---|---|
| Sludge as solids content (wt %) | None | 2.9 | 8.6 | 28.6 |
| Maximum caustic excess (ppm) | 50 | 100 | 200 | 250 |

Viewed another way this invention involves a brine purification process wherein silicon, calcium and magnesium are to be removed from brine and where excess amounts of both sodium hydroxide and sodium carbonate have been previously used in the process, the improvement of this invention comprises maintaining an excess amount of sodium carbonate while reducing the excess amount of sodium hydroxide in process to produce a brine having a substantially diminished amount of silicon in the final brine product. For example, silicon is reduced to 1 ppm or less. The sodium hydroxide excess employed in the process is 0–70 ppm. However, ranges of 30–70 ppm or 30–50 ppm are operative. The amount of sodium carbonate excess can be 100 to 1,000 ppm. A preferred treatment is for one to four hours with stirring. Treatment times of up to 24 hours are acceptable. However, this time period can be varied as understood by those skilled in the art. The precipitate can be recycled to increase the effective range of caustic excess.

Alternatively, a two-stage process whereby a fraction of the amount of caustic and carbonate experimentally determined to neutralize the brine is added in a first step, thereby reducing silicon to less that 0.5 ppm.

The precipitated magnesium and calcium are removed and the clarified brine is further treated in a second step, with additional caustic and carbonate to an excess of 50–1,000 ppm to remove the remainder of calcium and magnesium. Treated brine containing less that 0.5 ppm silicon is filtered and removed.

The process of this invention envisions the brine being heated, e.g., to a temperature of approximately 120° to 160° F. with a temperature of approximately 140° F. being preferred. The process is carried out over a one to four-hour period. A period of 24 hours would be acceptable. To further reduce silicon, the brine is filtered through a sludge blanket to further reduce the amount of silicon therein. The temperature and time parameters can be varied as understood by those skilled in the art.

There are many advantages to employing the processes of this invention:

1. The new brine treatment process can be carried out at a narrow 9.0–9.9 pH range, at 140 degrees F., with two hours residence time. This removes silicon to <1 ppm, magnesium 0.1 ppm and calcium to <2 ppm.

2. Additionally, brine treatment sludge can be recycled to the treater to increase the effective pH range of the process.

3. Less NaOH is necessary than standard treatment processes.

4. A further advantage of this invention is that very low silicon levels are obtainable with standard commercial equipment, while at the same time obtaining low levels of magnesium and calcium. It should be noted that other minor metal contaminants like barium and strontium, are shown by full metals analysis of brine treated with the new process to also be of reduced levels, e.g., as low or lower than prior standard treatment. Membrane technology has created the need for low silicon brine and this technology appears to be commercially robust, advantageously, this invention provides the ability to produce brine with silicon lower than 0.5 ppm if desired.

5. The effluent of this process has a lower pH, thus requiring less HCl to neutralize before entering the chloralkali cells.

Obviously, many modifications may be made without departing from the basic spirit of the present invention. Accordingly, it will be appreciated by those skilled in the art that within the scope of the appended claims, the invention may be practiced other than has been specifically described herein.

What is claimed is:

1. In a brine purification process wherein silicon, calcium and magnesium are to be removed from brine and where excess amounts of both sodium hydroxide and sodium carbonate have been previously used in the process, the improvement comprising maintaining an excess amount of sodium carbonate in the range of about 100 to 1.000 ppm while reducing the excess amount of sodium hydroxide to about 0–70 ppm in the process to produce a final brine product having a substantially diminished amount of silicon of 1 ppm or less.

2. The process of claim 1 wherein the sodium hydroxide excess is 30–70 ppm.

3. The process of claim 2 wherein the sodium hydroxide excess is 30–50 ppm such that the final brine product has 0.5 ppm or less of silicon.

4. The process of claim 1 wherein the brine purification process lasts for one to four hours with stirring.

5. The process of claim 1 wherein sludge is recycled with the magnesium maintained at 1,000–5,000 ppm to further improve brine purification.

6. A process for removal of metals and silicon from brine comprising a process whereby a fraction of the amount of caustic and carbonate experimentally determined to neutralize the brine is added in a first step, thereby reducing silicon to less than 0.5 ppm and then precipitated magnesium and calcium are removed and the clarified brine is further treated in a second step, with additional caustic and carbonate to an excess of 50–1,000 ppm to remove the remainder of calcium and magnesium.

7. The process of claim 6 wherein the brine, after the second step, is filtered.

8. The process of claim 1 wherein the process is carried out with the brine being heated.

9. The process of claim 8 wherein the brine is heated to a temperature of 120° to 160° F.

10. The process of claim 9 wherein the temperature is 140° F.

11. The process of claim 1 wherein the brine is filtered through a sludge blanket to further reduce the amount of silicon therein.

12. The process of claim 1 carried out over a one to twenty-four-hour period.

* * * * *